(12) United States Patent
Desai et al.

(10) Patent No.: US 8,503,463 B2
(45) Date of Patent: Aug. 6, 2013

(54) HETEROGENEOUS MEDIA PACKET BRIDGING

(75) Inventors: Sachin Desai, Santa Clara, CA (US); Rajesh Balay, Cupertino, CA (US); Chandramouli Sargor, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 232 days.

(21) Appl. No.: 13/154,330

(22) Filed: Jun. 6, 2011

(65) Prior Publication Data

US 2011/0235649 A1 Sep. 29, 2011

Related U.S. Application Data

(63) Continuation of application No. 12/781,807, filed on May 17, 2010, now Pat. No. 7,957,407, which is a continuation of application No. 10/650,298, filed on Aug. 27, 2003, now Pat. No. 7,720,095.

(51) Int. Cl.
*H04L 12/28* (2006.01)

(52) U.S. Cl.
USPC .......................... 370/401; 370/466; 370/389

(58) Field of Classification Search
None
See application file for complete search history.

(56) References Cited

U.S. PATENT DOCUMENTS

| | | | |
|---|---|---|---|
| 4,667,287 A | 5/1987 | Allen et al. |
| 4,667,323 A | 5/1987 | Engdahl et al. |
| 4,726,018 A | 2/1988 | Bux et al. |
| 5,473,599 A | 12/1995 | Li et al. |
| 5,483,525 A | 1/1996 | Song et al. |
| 5,490,252 A | 2/1996 | Macera et al. |
| 5,491,691 A | 2/1996 | Shtayer et al. |
| 5,550,816 A | 8/1996 | Hardwick et al. |
| 5,581,705 A | 12/1996 | Passint et al. |
| 5,598,414 A | 1/1997 | Walser et al. |
| 5,633,866 A | 5/1997 | Callon |

(Continued)

FOREIGN PATENT DOCUMENTS

| | | |
|---|---|---|
| WO | 0051290 | 8/2000 |
| WO | 0076152 | 12/2000 |

(Continued)

OTHER PUBLICATIONS

Non-Final Rejection for U.S. Appl. No. 12/762,362 mailed Feb. 2, 2012.

(Continued)

*Primary Examiner* — David Oveissi
(74) *Attorney, Agent, or Firm* — Hamilton, DeSanctis & Cha LLP (57) ABSTRACT

Methods and systems for bridging network packets transmitted over heterogeneous media channels are provided. According to one embodiment, a network-computing device comprises multiple network interfaces (netmods) and a shared processing resource. The shared processing resource executes a virtual bridging application representing a single bridging domain for all network packets received by the network-computing device. A translation data structure defines translations between a first framing media format and an intermediate format and between the intermediate format and a second framing media format. If the virtual bridging application determines a network packet is to be relayed between a netmod operable to receive network packets encapsulated within the first framing media format and a netmod operable to transmit network packets encapsulated within the second framing media format, then it uses the translation data structures to translate the network packet before relaying the network packet.

15 Claims, 4 Drawing Sheets

U.S. PATENT DOCUMENTS

| | | |
|---|---|---|
| 5,745,778 A | 4/1998 | Alfieri |
| 5,825,772 A | 10/1998 | Dobbins et al. |
| 5,825,891 A | 10/1998 | Levesque et al. |
| 5,841,973 A | 11/1998 | Kessler et al. |
| 5,875,290 A | 2/1999 | Bartfal et al. |
| 5,892,924 A | 4/1999 | Lyon et al. |
| 5,920,705 A | 7/1999 | Lyon et al. |
| 5,963,555 A | 10/1999 | Takase et al. |
| 5,964,847 A | 10/1999 | Booth et al. |
| 5,987,521 A | 11/1999 | Arrowood et al. |
| 6,014,382 A | 1/2000 | Takihiro et al. |
| 6,032,193 A | 2/2000 | Sullivan |
| 6,047,330 A | 4/2000 | Stracke |
| 6,069,895 A | 5/2000 | Ayandeh |
| 6,085,238 A | 7/2000 | Yuasa et al. |
| 6,094,674 A | 7/2000 | Hattori et al. |
| 6,098,110 A | 8/2000 | Witkowski et al. |
| 6,118,791 A | 9/2000 | Fichou et al. |
| 6,134,226 A | 10/2000 | Reed et al. |
| 6,137,777 A | 10/2000 | Vaid et al. |
| 6,169,739 B1 | 1/2001 | Isoyama |
| 6,169,793 B1 | 1/2001 | Gowdin et al. |
| 6,173,399 B1 | 1/2001 | Gilbrech |
| 6,175,867 B1 | 1/2001 | Taghadoss |
| 6,192,051 B1 | 2/2001 | Lipman et al. |
| 6,212,556 B1 | 4/2001 | Arunachalam |
| 6,220,768 B1 | 4/2001 | Barroux |
| 6,226,788 B1 | 5/2001 | Schoening et al. |
| 6,243,580 B1 | 6/2001 | Garner |
| 6,246,682 B1 | 6/2001 | Roy et al. |
| 6,249,519 B1 | 6/2001 | Rangachar |
| 6,256,295 B1 | 7/2001 | Callon |
| 6,260,072 B1 | 7/2001 | Rodriguez |
| 6,260,073 B1 | 7/2001 | Walker et al. |
| 6,266,695 B1 | 7/2001 | Huang et al. |
| 6,272,500 B1 | 8/2001 | Sugita |
| 6,278,708 B1 | 8/2001 | Von Hammerstein et al. |
| 6,286,038 B1 | 9/2001 | Reichmeyer et al. |
| 6,295,297 B1 | 9/2001 | Lee |
| 6,298,130 B1 | 10/2001 | Galvin |
| 6,324,583 B1 | 11/2001 | Stevens |
| 6,330,602 B1 | 12/2001 | Law et al. |
| 6,338,092 B1 | 1/2002 | Chao et al. |
| 6,339,782 B1 | 1/2002 | Gerard et al. |
| 6,343,083 B1 | 1/2002 | Mendelson et al. |
| 6,405,262 B1 | 6/2002 | Vogel et al. |
| 6,414,595 B1 | 7/2002 | Scrandis et al. |
| 6,434,619 B1 | 8/2002 | Lim et al. |
| 6,449,650 B1 | 9/2002 | Westfall et al. |
| 6,453,406 B1 | 9/2002 | Sarnikowski et al. |
| 6,463,061 B1 | 10/2002 | Rekhter et al. |
| 6,466,976 B1 | 10/2002 | Alles et al. |
| 6,487,666 B1 | 11/2002 | Shanklin |
| 6,493,349 B1 | 12/2002 | Casey |
| 6,526,056 B1 | 2/2003 | Rekhter et al. |
| 6,532,088 B1 | 3/2003 | Dantu |
| 6,542,466 B1 | 4/2003 | Pashtan et al. |
| 6,542,502 B1 | 4/2003 | Herring et al. |
| 6,553,423 B1 | 4/2003 | Chen |
| 6,556,544 B1 | 4/2003 | Lee |
| 6,608,816 B1 | 8/2003 | Nichols |
| 6,611,522 B1 | 8/2003 | Zheng et al. |
| 6,614,781 B1 | 9/2003 | Elliott et al. |
| 6,625,169 B1 | 9/2003 | Tofano |
| 6,625,650 B2 | 9/2003 | Stelliga |
| 6,629,128 B1 | 9/2003 | Glass |
| 6,636,516 B1 | 10/2003 | Yamano |
| 6,639,897 B1 | 10/2003 | Shiomoto et al. |
| 6,658,013 B1 | 12/2003 | de Boer et al. |
| 6,668,282 B1 | 12/2003 | Booth et al. |
| 6,697,359 B1 | 2/2004 | George |
| 6,697,360 B1 | 2/2004 | Gai et al. |
| 6,701,449 B1 | 3/2004 | Davis et al. |
| 6,704,318 B1 | 3/2004 | Stuart et al. |
| 6,738,371 B1 | 5/2004 | Ayres |
| 6,738,821 B1 | 5/2004 | Wilson et al. |
| 6,775,267 B1 | 8/2004 | Kung |
| 6,778,502 B2 | 8/2004 | Ricciulli |
| 6,785,691 B1 | 8/2004 | Hewett et al. |
| 6,802,068 B1 | 10/2004 | Guruprasad |
| 6,816,462 B1 | 11/2004 | Booth et al. |
| 6,822,958 B1 | 11/2004 | Branth et al. |
| 6,868,082 B1 | 3/2005 | Allen et al. |
| 6,883,170 B1 | 4/2005 | Garcia |
| 6,894,994 B1 | 5/2005 | Grob et al. |
| 6,907,039 B2 | 6/2005 | Shen |
| 6,920,146 B1 | 7/2005 | Johnson et al. |
| 6,920,580 B1 | 7/2005 | Cramer et al. |
| 6,922,774 B2 | 7/2005 | Meushaw et al. |
| 6,938,097 B1 | 8/2005 | Vincent |
| 6,944,128 B2 | 9/2005 | Nichols |
| 6,944,168 B2 | 9/2005 | Paatela et al. |
| 6,954,429 B2 | 10/2005 | Horton et al. |
| 6,980,526 B2 | 12/2005 | Jang et al. |
| 6,985,438 B1 | 1/2006 | Tschudin |
| 6,985,956 B2 | 1/2006 | Luke et al. |
| 6,990,103 B1 | 1/2006 | Gollamudi |
| 7,020,143 B2 | 3/2006 | Zdan |
| 7,042,848 B2 | 5/2006 | Santiago et al. |
| 7,054,311 B2 | 5/2006 | Norman et al. |
| 7,082,477 B1 | 7/2006 | Sadhasivam et al. |
| 7,089,293 B2 | 8/2006 | Grosner et al. |
| 7,096,495 B1 | 8/2006 | Warrier et al. |
| 7,149,216 B1 | 12/2006 | Cheriton |
| 7,221,945 B2 | 5/2007 | Milford |
| 7,225,259 B2 | 5/2007 | Ho et al. |
| 7,243,371 B1 | 7/2007 | Kasper et al. |
| 7,266,120 B2 | 9/2007 | Cheng et al. |
| 7,272,643 B1 | 9/2007 | Sarkar |
| 7,295,116 B2 | 11/2007 | Kumar et al. |
| 7,313,614 B2 | 12/2007 | Considine et al. |
| 7,316,029 B1 | 1/2008 | Parker et al. |
| 7,324,489 B1 | 1/2008 | Iyer |
| 7,324,889 B2 | 1/2008 | Arai et al. |
| 7,386,010 B2 | 6/2008 | Solomon et al. |
| 7,639,632 B2 | 12/2009 | Sarkar |
| 7,720,053 B2 | 5/2010 | Hussain |
| 7,761,743 B2 | 7/2010 | Talaugon |
| 7,830,787 B1 | 11/2010 | Wijnands et al. |
| 7,881,244 B2 | 2/2011 | Balay |
| 7,885,207 B2 | 2/2011 | Sarkar |
| 7,912,936 B2 | 3/2011 | Rajagopalan |
| 7,925,920 B2 | 4/2011 | Talaugon |
| 7,933,269 B2 | 4/2011 | Cheng |
| 7,957,407 B2 * | 6/2011 | Desai et al. ............... 370/401 |
| 7,961,615 B2 | 6/2011 | Balay |
| 8,068,503 B2 | 11/2011 | Desai et al. |
| 8,107,376 B2 | 1/2012 | Balay et al. |
| 8,208,409 B2 | 6/2012 | Millet |
| 8,213,347 B2 | 7/2012 | Balay et al. |
| 8,306,040 B2 | 11/2012 | Desai et al. |
| 8,320,279 B2 | 11/2012 | Sarkar et al. |
| 8,369,258 B2 | 2/2013 | Balay et al. |
| 8,374,088 B2 | 2/2013 | Balay et al. |
| 2001/0028636 A1 | 10/2001 | Skog et al. |
| 2001/0033580 A1 | 10/2001 | Dorsey et al. |
| 2001/0043571 A1 | 11/2001 | Kent |
| 2001/0048661 A1 | 12/2001 | Clear et al. |
| 2001/0052013 A1 | 12/2001 | Munguia et al. |
| 2002/0023171 A1 | 2/2002 | Garrett et al. |
| 2002/0062344 A1 | 5/2002 | Ylonen et al. |
| 2002/0066034 A1 | 5/2002 | Schlossberg et al. |
| 2002/0075901 A1 | 6/2002 | Perlmutter et al. |
| 2002/0097730 A1 | 7/2002 | Langille et al. |
| 2002/0097872 A1 | 7/2002 | Maliszewski |
| 2002/0099849 A1 | 7/2002 | Alfieri et al. |
| 2002/0152373 A1 | 10/2002 | Sun et al. |
| 2002/0186661 A1 | 12/2002 | Santiago et al. |
| 2002/0191604 A1 | 12/2002 | Mitchell et al. |
| 2003/0026262 A1 | 2/2003 | Jarl |
| 2003/0033401 A1 | 2/2003 | Poisson et al. |
| 2003/0108041 A1 | 6/2003 | Aysan |
| 2003/0115308 A1 | 6/2003 | Best et al. |
| 2003/0117954 A1 | 6/2003 | De Neve et al. |
| 2003/0131228 A1 | 7/2003 | Tworney |
| 2003/0169747 A1 | 9/2003 | Wang |
| 2003/0185221 A1 | 10/2003 | Deikman et al. |

| | | |
|---|---|---|
| 2003/0200295 A1 | 10/2003 | Roberts et al. |
| 2003/0212735 A1 | 11/2003 | Hicok et al. |
| 2003/0223406 A1 | 12/2003 | Balay |
| 2004/0037279 A1* | 2/2004 | Zelig et al. ............... 370/390 |
| 2004/0042416 A1 | 3/2004 | Ngo et al. |
| 2004/0095932 A1 | 5/2004 | Astarabadi et al. |
| 2004/0095934 A1 | 5/2004 | Cheng et al. |
| 2004/0141521 A1 | 7/2004 | George |
| 2005/0002417 A1 | 1/2005 | Kelly et al. |
| 2005/0055306 A1 | 3/2005 | Miller et al. |
| 2005/0113114 A1 | 5/2005 | Asthana |
| 2005/0147095 A1 | 7/2005 | Guerrero et al. |
| 2005/0163115 A1 | 7/2005 | Dontu et al. |
| 2005/0213589 A1 | 9/2005 | Shih |
| 2006/0087969 A1 | 4/2006 | Santiago et al. |
| 2010/0142527 A1 | 6/2010 | Balay et al. |
| 2010/0146098 A1 | 6/2010 | Ishizakl et al. |
| 2010/0146627 A1 | 6/2010 | Lin |
| 2010/0189016 A1 | 7/2010 | Millet |
| 2010/0220732 A1 | 9/2010 | Hussain et al. |
| 2010/0220741 A1 | 9/2010 | Desai et al. |
| 2011/0122872 A1 | 5/2011 | Balay |
| 2011/0235548 A1 | 9/2011 | Balay |
| 2011/0235649 A1 | 9/2011 | Desai |
| 2011/0249812 A1 | 10/2011 | Barnhouse et al. |
| 2012/0057460 A1 | 3/2012 | Hussain |
| 2012/0069850 A1 | 3/2012 | Desai |
| 2012/0072568 A1 | 3/2012 | Matthews |
| 2012/0099596 A1 | 4/2012 | Balay |
| 2012/0131215 A1 | 5/2012 | Balay et al. |
| 2012/0324216 A1 | 12/2012 | Sun |
| 2012/0324532 A1 | 12/2012 | Matthews |
| 2013/0022049 A1 | 1/2013 | Millet |

FOREIGN PATENT DOCUMENTS

| | | |
|---|---|---|
| WO | 0163809 | 8/2001 |
| WO | 0223855 | 3/2002 |
| WO | 03010323 | 12/2003 |

OTHER PUBLICATIONS

Lawrence, J. Lang et al."Connecting Remote FDDI Installations with Single-Mode Fiber, Dedicated Lines, or SMDS." Jul. 1990; ACM SIGCOMM Computer Communication Review. vol. 20, Issue 3; pp. 72-82.
IEEE Potentials Publication; "Local Area Networks" Dec. 95/Jan. 96; pp. 6. http://www.ece.uc.edu/-paw/potentials/sample.
Office Action dated Oct. 18, 2007 for U.S. Appl. No. 09/663,483.
Office Action dated Oct. 16, 2007 for U.S. Appl. No. 09/661,130.
Office Action dated Nov. 28, 2007 for U.S. Appl. No. 09/952,520.
A lightweight Protocol for Interconnection Heterogenous Devices in Dynamic Environments, (c) 1999, obtained from the Internet at : http//ieeexplore.ieee.org/iel5/6322/16898/00778477.pdf.
The Guide to Computing Literature, Jairo A.: A Framework and Lightweight Protocol for Multimedia Network Management, vol. 8, Issue 1, published 2000, ISSN: 1064-7570.
Bookfinder4u.com: High Performance Networks by Ahmed N. Tantawy, ISBN-10: 0792393716, Published 1993, Lightweight Protocols.
Ipinfusion white paper: Virtual Routing for Provide Edge Application, obtained from the Internet at: http://www.ipinfusion.com/pdf/VirtualRouting_app-note_3rev0302.pdf, pp. 1-8.
Non-Final Office Action for U.S. Appl. No. 10/991,969, dated Feb. 20, 2008.
Non-Final Office Action for U.S. Appl. No. 10/273,669, dated Feb. 20, 2008.
Non-Final Office Action for U.S. Appl. No. 10/949,943 dated Feb. 14, 2008.
Restriction Requirement for U.S. Appl. No. 11/556,697, dated Mar. 13, 2008.
Amendment and Response filed on Nov. 12, 2004 for U.S. Appl. No. 09/663,484.
Office Action dated May 6, 2004 for U.S. Appl. No. 09/663,484.
Amendment and Response filed on Feb. 18, 2004 for U.S. Appl. No. 09/663,484.
Office Action dated Aug. 12, 2003 for U.S. Appl. No. 09/663,484.
Notice of Allowance dated Jan. 4, 2007 for U.S. Appl. No. 09/894,471.
Amendment and Response filed on Nov. 2, 2006 for U.S. Appl. No. 09/894,471.
Office Action dated Oct. 26, 2006 for U.S. Appl. No. 09/894,471.
Amendment and Response filed on Mar. 10, 2006 for U.S. Appl. No. 09/894,471.
Office Action dated Dec. 14, 2004 for U.S. Appl. No. 09/894,471.
Notice of Allowance dated Nov. 7, 2006 for U.S. Appl. No. 09/771,346.
Amendment and Response filed on Oct. 18, 2006 for U.S. Appl. No. 09/771,346.
Office Action dated Jul. 18, 2006 for U.S. Appl. No. 09/771,346.
Amendment and Response filed on Mar. 13, 2006 for U.S. Appl. No. 09/771,346.
Office Action dated Jan. 25, 2005 for U.S. Appl. No. 09/771,346.
Amendment and Response filed on Oct. 14, 2004 for U.S. Appl. No. 09/771,346.
Office Action dated Mar. 26, 2004 for U.S. Appl. No. 09/771,346.
Notice of Allowance dated Nov. 19, 2006 for U.S. Appl. No. 10/163,162.
Amendment and Response filed on Aug. 5, 2006 for U.S. Appl. No. 10/163,162.
Office Action dated May 5, 2006 for U.S. Appl. No. 10/163,162.
Notice of Allowance dated Jan. 4, 2007 for U.S. Appl. No. 10/163,261.
Amendment and Response filed on Nov. 9, 2006 for U.S. Appl. No. 10/163,261.
Office Action dated Nov. 3, 2006 for U.S. Appl. No. 10/163,261.
Amendment and Response filed on Aug. 22, 2006 for U.S. Appl. No. 10/163,261.
Office Action dated May 22, 2006 for U.S. Appl. No. 10/163,261.
Notice of Allowance dated Jul. 27, 2006 for U.S. Appl. No. 10/163,073.
Office Action dated May 30, 2007 for U.S. Appl. No. 10/273,669.
Amendment and Response filed on Mar. 9, 2007 for U.S. Appl. No. 10/273,669.
Office Action dated Sep. 21, 2006 for U.S. Appl. No. 10/273,669.
Amendment and Response filed on Jun. 21, 2006 for U.S. Appl. No. 10/273,669.
Office Action dated Feb. 21, 2006 for U.S. Appl. No. 10/273,669.
Notice of Allowance dated Aug. 14, 2007 for U.S. Appl. No. 10/163,071.
Amendment and Response filed on Jul. 17, 2007 for U.S. Appl. No. 10/163,071.
Office Action dated Jul. 3, 2007 for U.S. Appl. No. 10/163,071.
Amendment and Response filed on May 6, 2007 for U.S. Appl. No. 10/163,071.
Office Action dated Nov. 7, 2006 for U.S. Appl. No. 10/163,071.
Amendment and Response filed on Sep. 1, 2006 for U.S. Appl. No. 10/163,071.
Office Action dated Jun. 1, 2006 for U.S. Appl. No. 10/163,071.
Amendment and Response filed on Mar. 6, 2006 for U.S. Appl. No. 10/163,071.
Office Action dated Dec. 2, 2005 for U.S. Appl. No. 10/163,071.
Notice of Allowance dated Nov. 29, 2006 for U.S. Appl. No. 10/163,079.
Amendment and Response filed on Nov. 1, 2006 for U.S. Appl. No. 10/163,079.
Office Action dated Oct. 27, 2006 for U.S. Appl. No. 10/163,079.
Amendment and Response filed on Aug. 17, 2006 for U.S. Appl. No. 10/163,079.
Office Action dated May 17, 2006 for U.S. Appl. No. 10/163,079.
Notice of Allowance dated Jul. 17, 2007 for U.S. Appl. No. 10/298,815.
Amendment and Response filed on Mar. 9, 2007 for U.S. Appl. No. 10/298,815.
Office Action dated Feb. 23, 2007 for U.S. Appl. No. 10/298,815.
Notice of Allowance dated Jun. 27, 2005 for U.S. Appl. No. 10/232,979.
Notice of Allowance dated Jul. 5, 2007 for U.S. Appl. No. 11/466,098.

Amendment and Response filed on Aug. 10, 2007 for U.S. Appl. No. 10/163,260.
Non-Final Rejection for U.S. Appl. No. 12/637,140, mailed Sep. 17, 2010.
Non-Final Rejection for U.S. Appl. No. 12/537,898, mailed Sep. 9, 2010.
Final Rejection for U.S. Appl. No. 12/202,223, mailed Sep. 16, 2010.
Non-Final Rejection for U.S. Appl. No. 12/202,233 mailed Jun. 21, 2010.
Non-Final Rejection for U.S. Appl. No. 11/460,977, mailed Jul. 2, 2010.
Non-Final Rejection for U.S. Appl. No. 12/477,124 mailed May 23, 2011.
Non-Final Rejection for U.S. Appl. No. 11/537,609 mailed Jul. 11, 2011.
Final Rejection for U.S. Appl. No. 12/477,124, mailed Nov. 4, 2011.
Non-Final Rejection for U.S. Appl. No. 11/530,901, mailed Nov. 9, 2011.
Non-Final Rejection for U.S. Appl. No. 13/359,960, mailed Apr. 26, 2012.
Chan, Mun C. et al., "An architecture for broadband virtual networks under customer control." IEEE Network Operations and Management Symposium. Apr. 1996. pp. 135-144.
Chan, Mun C. et al "Customer Management and Control of Broadband VPN Services." Proc. Fifth IFIP/IEEE International Symposium of Integrated Network Management. May 1997. pp. 301-314.
Gasparro, D.M., "Next-Gen VPNs: The Design Challenge." Data Communications. Sep. 1999. pp. 83-95.
Hanaki, M. et al., "LAN/WAN management integration using ATM CNM interface." IEEE Network Operations Management Symposium, vol. 1. Apr. 1996. pp. 12-21.
Kapustka, S., "CoSine Communications Move VPNs 'Into the Cloud' with the Leading Managed IP Service Delivery Platform." http://wwwcosinecom.com/news/pr_5_24.html. Press Release, CoSine Communications. 1995. p. 5.
Keshav, S., "An Engineering Approach to Computer Networking: ATM networks, the internet, and the telephone network." Reading Mass: Addison-Wesley, Addison-Wesley Professional Computing Series. 1992. pp. 318-324.
Kim, E.C. et al., "The Multi-Layer VPN Management Architecture." Proc. Sixth IFIP/IEEE International Symposium on Integrated Network Management. May 1999. pp. 187-200.
Rao, J.R., Intranets and VPNs: Strategic Approach. 1988 Annual Review of Communications. 1998. pp. 669-674.
Tanenbaum, A.S., "Computer Networks." Upper Saddle River, N.J.: Prentice Hall PTR, 3rd Edition. 1996. pp. 348-364.
European Search Report for PCT/US03/37009 (Jul. 4, 2004) 2 pgs.
International Search Report for PCTUS03/17674. 6 pgs.
Non-Final Office Action for U.S. Appl. No. 11/849,352 mailed Jul. 17, 2009.
Non-Final Office Action for U.S. Appl. No. 10/991,970 mailed May 18, 2009.
Final Office Action for U.S. Appl. No. 12/467,609 mailed Apr. 19, 2011.
Non-Final Office Action for U.S. Appl. No. 12/328,858 mailed Apr. 15, 2011.
Notice of Allowance for U.S. Appl. No. 12/328,858 mailed May 25, 2012.
Notice of Allowance for U.S. Appl. No. 12/762,362 mailed May 22, 2012.
Office Action dated Aug. 1, 2007 for U.S. Appl. No. 10/163,260.
Amendment and Response filed on May 23, 2007 for U.S. Appl. No. 10/163,260.
Office Action dated Apr. 13, 2007 for U.S. Appl. No. 10/163,260.
Amendment and Response filed on Mar. 13, 2007 for U.S. Appl. No. 10/163,260.
Office Action dated Dec. 21, 2006 for U.S. Appl. No. 10/163,260.
Amendment and Response filed on Sep. 18, 2006 for U.S. Appl. No. 10/163,260.
Office Action dated May 18, 2006 for U.S. Appl. No. 10/163,260.
Office Action dated Aug. 22, 2007 for U.S. Appl. No. 10/650,298.
Response to Restriction Requirement Apr. 26, 2004 for U.S. Appl. No. 09/663,483.

Restriction Requirement dated Mar. 22, 2004 for U.S. Appl. No. 09/663,483.
Office Action dated Sep. 11, 2007 for U.S. Appl. No. 09/661,637.
Amendment and Response filed on Jun. 20, 2007 for U.S. Appl. No. 09/661,637.
Office Action dated Feb. 8, 2007 for U.S. Appl. No. 09/661,637.
Amendment and Response filed on Mar. 6, 2006 for U.S. Appl. No. 09/661,637.
Office Action dated Dec. 23, 2004 for U.S. Appl. No. 09/661,637.
Amendment and Response filed on Aug. 5, 2004 for U.S. Appl. No. 09/661,637.
Office Action dated May 5, 2004 for U.S. Appl. No. 09/661,637.
Supplemental Amendment and Response filed on Sep. 17, 2007, 2007 for U.S. Appl. No. 09/663,457.
Notice of Allowance for U.S. Appl. No. 13/305,743 mailed Jul. 25, 2012.
Notice of Allowance for U.S. Appl. No. 11/530,901 mailed Jul. 20, 2012.
Notice of Allowance for U.S. Appl. No. 09/952,520 mailed Jul. 6, 2012.
Notice of Allowance for U.S. Appl. No. 12/477,124 mailed Sep. 19, 2012.
Notice of Allowance for U.S. Appl. No. 13/022,696 mailed Oct. 12, 2012.
Final Rejection for U.S. Appl. No. 10/650,298 mailed Sep. 3, 2008.
Non-Final Rejection for U.S. Appl. No. 10/650,298 mailed Dec. 31, 2009.
Notice of Allowance for for U.S. Appl. No. 10/650,298 mailed Apr. 5, 2010.
Notice of Allowance for for U.S. Appl. No. 12/781,807 mailed Apr. 29, 2011.
Non-Final Rejection for U.S. Appl. No. 12/781,807 mailed Nov. 15, 2010.
Non-Final Rejection for U.S. Appl. No. 12/906,999 mailed Nov. 21, 2012.
Non-Final Rejection for U.S. Appl. No. 13/050,387 mailed Nov. 13, 2012.
Non-Final Rejection for U.S. Appl. No. 12/328,858, mailed Dec. 6, 2011.
Non-Final Rejection for U.S. Appl. No. 12/259,296, mailed Sep. 27, 2011.
Notice of Allowance for U.S. Appl. No. 13/015,880 mailed Dec. 5, 2012.
Notice of Allowance for U.S. Appl. No. 13/359,960 mailed Jan. 9, 2013.
Notice of Allowance dated Dec. 1, 2004 for U.S. Appl. No. 09/661,636.
Amendment and Response filed on Sep. 2, 2004 for U.S. Appl. No. 09/661,636.
Office Action dated May 28, 2004 for U.S. Appl. No. 09/661,636.
Amendment and Response filed on Mar. 22, 2004 for U.S. Appl. No. 09/661,636.
Office Action dated Nov. 18, 2003 U.S. Appl. No. 09/661,636.
Amendment and Response filed on Apr. 29, 2007 for U.S. Appl. No. 09/661,130.
Office Action dated Dec. 28, 2006 for U.S. Appl. No. 09/661,130.
Amendment and Response filed on Mar. 6, 2006 for U.S. Appl. No. 09/661,130.
Office Action dated Oct. 18, 2004 for U.S. Appl. No. 09/661,130.
Amendment and Response filed on Apr. 9, 2004 for U.S. Appl. No. 09/661,130.
Office Action dated Nov. 5, 2003 for U.S. Appl. No. 09/661,130.
Notice of Allowance dated Jun. 14, 2007 for U.S. Appl. No. 10/067,106.
Amendment and Response filed on Mar. 10, 2007 for U.S. Appl. No. 10/067,106.
Office Action dated Nov. 16, 2006 for U.S. Appl. No. 10/067,106.
Amendment and Response filed on Aug. 28, 2006 for U.S. Appl. No. 10/067,106.
Office Action dated Mar. 27, 2006 for U.S. Appl. No. 10/067,106.
Amendment and Response filed on Nov. 6, 2006 for U.S. Appl. No. 09/663,483.
Office Action dated Jul. 6, 2006 for U.S. Appl. No. 09/663,483.

Amendment and Response filed on Mar. 13, 2006 for U.S. Appl. No. 09/663,483.
Advisory Action dated Nov. 12, 2004 for U.S. Appl. No. 09/663,483.
Amendment and Response filed on Oct. 8, 2004 for U.S. Appl. No. 09/663,483.
Office Action dated Jun. 3, 2004 for U.S. Appl. No. 09/663,483.
Amendment and Response filed on Feb. 26, 2004 for U.S. Appl. No. 09/663,483.
Office Action dated Aug. 21, 2003 for U.S. Appl. No. 09/663,483.
Amendment and Response filed on Mar. 13, 2006 for U.S. Appl. No. 09/952,520.
Office Action dated Mar. 14, 2005 for U.S. Appl. No. 09/952,520.
Notice of Allowance dated Jul. 30, 2007 for U.S. Appl. No. 09/663,485.
Amendment and Response filed on Jun. 11, 2007 for U.S. Appl. No. 09/663,485.
Office Action dated Jan. 11, 2007 for U.S. Appl. No. 09/663,485.
Amendment and Response filed on Aug. 28, 2006 for U.S. Appl. No. 09/663,485.
Office Action dated Jul. 26, 2007 for U.S. Appl. No. 09/663,485.
Amendment and Response filed on Feb. 2, 2006 for U.S. Appl. No. 09/663,485.
Office Action dated Dec. 21, 2004 for U.S. Appl. No. 09/663,485.
Amendment and Response filed on Nov. 16, 2004 for U.S. Appl. No. 09/663,485.
Office Action dated May 14, 2004 for U.S. Appl. No. 09/663,485.
Amendment and Response filed on Mar. 15, 2004 for U.S. Appl. No. 09/663,485.
Office Action dated Sep. 8, 2003 for U.S. Appl. No. 09/663,485.
Office Action dated Aug. 8, 2007 for U.S. Appl. No. 09/663,457.
Amendment and Response filed on Jul. 11, 2007 for U.S. Appl. No. 09/663,457.
Office Action dated May 17, 2007 for U.S. Appl. No. 09/663,457.
Amendment and Response filed on Oct. 2, 2006 for U.S. Appl. No. 09/663,457.
Office Action dated Apr. 22, 2005 for U.S. Appl. No. 09/663,457.
Office Action dated Aug. 27, 2004 for U.S. Appl. No. 09/663,457.
Amendment and Response filed on Jun. 21, 2004 for U.S. Appl. No. 09/663,457.
Office Action dated Dec. 11, 2003 for U.S. Appl. No. 09/663,457.
Notice of Allowance dated Nov. 21, 2006 for U.S. Appl. No. 09/663,484.
Amendment and Response filed on Aug. 24, 2006 for U.S. Appl. No. 09/663,484.
Office Action dated Feb. 24, 2006 for U.S. Appl. No. 09/663,484.
Amendment and Response filed on Feb. 7, 2006 for U.S. Appl. No. 09/663,484.
Office Action dated Apr. 6, 2005 for U.S. Appl. No. 09/663,484.

* cited by examiner

HETEROGENEOUS MEDIA PACKET BRIDGING

CROSS-REFERENCE TO RELATED APPLICATIONS

This application is a continuation of U.S. patent application Ser. No. 12/781,807, filed May 17, 2010, now U.S. Pat. No. 7,957,407, which is a continuation of U.S. patent application Ser. No. 10/650,298, filed on Aug. 27, 2003, now U.S. Pat. No. 7,720,095, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2003-2011, Fortinet, Inc.

BACKGROUND

1. Field

Embodiments of the present invention generally relate to media packet bridging, and more particularly to bridging heterogeneous media packets received from network interfaces from a processing resource.

2. Description of the Related Art

Ethernet Local Area Networks (LANs) are used to connect multiple computing devices to a network. Generally a LAN configuration is sufficient when the number of computing devices (e.g., computers, appliances, peripherals) communication with one another is relatively small. However, when the number of computing devices increase, multiple networks or network segments will require interconnection. There are a variety of techniques for connecting multiple network segments. One of the easiest and oldest techniques for connecting multiple network segments is using an Ethernet Bridge. Ethernet bridges have multiple Ethernet Network Interfaces, which connect to networks that require a bridge.

Apart from being able to interconnect Ethernet Networks, bridges can also help with segregating network traffic. For example, in an enterprise with 5 departments having 25 computing devices each, on a separate segment is a simple way of connecting all 25 computing devices to a single LAN. While this technique will work, the technique has some obvious disadvantages, since computing devices associated with one department of the enterprise will be disrupted when two computing devices from another department communicate with one another. Thus, a more efficient network design for enterprise is to have a separate LAN for each separate department, where each separate LAN is interconnected with a bridge. In this way, all intra-department traffic will not be present to disrupt other traffic. Moreover, only inter-department traffic will be present on the bridge.

As previously discussed, Ethernet bridges are one of the oldest techniques for interconnecting LANs. Since the inception of Ethernet bridges, they have been enhanced to serve a variety of needs. Once such need relates to connecting (e.g., bridging) multiple LANs that are not in geographic proximity to one another. In these circumstances, Ethernet is transmitted on top of a different framing media (e.g., Asynchronous Transfer Mode (ATM), Gigabit Ethernet (GigE), Frame Relay (FR), Time-Division Multiplexing (TDM), and others). This creates an enhanced bridge with different framing media to external networks.

The enhanced bridge is capable of peeling off the framing headers to detect the Ethernet packet and then performing standard Ethernet bridging operations as if the data were received from a standard LAN interface. This type of enhanced Ethernet Bridge is widely implemented in enterprises with large network branches that are geographically dispersed in order to interconnect the LANs associated with the network branches.

There are a number of conventional products that perform Ethernet bridging over Ethernet media, Ethernet bridging over FR media, Ethernet bridging over ATM media, and the like. However, these conventional products do not permit media agnostic Ethernet bridging. In other words, conventional approaches use a separate and often hardwired network resource that communicates with a specific network interface media. Each network resource is dedicated to a network interface in order to provide Ethernet bridging for a specific media type (e.g. ATM, GigE, FR, TDM, and others) handled by the network interface.

By dedicating network resources to specific network interfaces, an enterprise's heterogeneous networks are not efficiently and flexibly interconnected. Many times the dedicated resources are the result of an enterprise gradually growing its networks, with a later decision to bring the networks together. Alternatively, enterprises can merge previously disconnected departmental networks, or merge with other enterprise networks, and there exist a desire to interconnect the heterogeneous networks. Yet, with conventional approaches the bridging domains for each disparate network are isolated using separate network resources. As one of ordinary skill in the art appreciates, this can be expensive, inflexible, and time consuming for an enterprise to implement.

Therefore, there exist a need for techniques that provide improved heterogeneous network bridging, which are media agnostic. Thus, network resources need not be hardwired or dedicated to a single network interface, and a single bridging domain can be used to bridge all media transmissions.

SUMMARY

Methods and systems are described for bridging network packets transmitted over heterogeneous media channels. According to one embodiment, a network-computing device comprises multiple network interfaces (netmods), multiple processing resources and a non-transitory memory. The netmods include a first set of netmods operable to receive network packets encapsulated within a first set of media transmissions each having a first framing media format of multiple framing media formats and a second set of netmods operable to transmit network packets encapsulated within a second set of media transmissions each having a second framing media format of the multiple framing media formats. The processing resources are coupled to and shared by the netmods and include a first processing resource upon which a virtual bridging application executes. The virtual bridging application represents a single bridging domain for all network packets received by the network-computing device. The non-transitory memory is accessible to the first processing resource and has stored therein one or more translation data structures defining translations between the first framing media format and an intermediate format and between the intermediate format and the second framing media format. Responsive to receiving a network packet, the first set of netmods pass the network packet to the virtual bridging application. The virtual bridging application determines a relay location to which the network packet is to be relayed and whether the relay location is among the second set of netmods, which are associated with a disparate framing media format and a disparate media channel than that of the first set of netmods. Responsive to an affirmative determination that the relay location is among the second set of netmods, the virtual bridging application uses the one or more translation data structures to translate the network packet to the second framing media format before relaying the network packet to the relay location.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Methods and systems are described for bridging network packets transmitted over heterogeneous media channels. In the following detailed description of various embodiments of the present invention, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

As used herein, a "network interface" or a "network media interface" (netmods) is a hardware and software-computing device that connects to telecommunications lines associated with network feeds. Netmods are well known to one of ordinary skill in the art. Netmods come in a variety of configurations and are usually distinguished by the number of telecommunication lines that can physically connect to line interface ports of the netmod.

Netmods include firmware and software to process raw packet data being received on a line interface port. Furthermore, some software instructions are processed within a volatile memory of the netmods. For example, some software instructions permit the recognition of separation of network data packets from a data stream being received over a line interface port. Additionally, software instructions can assign and regulate priorities to data packets being sent from the netmods back over a line interface port.

In various embodiments of the present invention, conventional netmods are used to achieve the teachings of the present invention. The netmods are also connected on the backend (e.g., the side opposite the network feed) to a switching fabric that is used to forward a network packet received from the netmod to one or more processing resources. The processing resources include one or more processing elements and memory. Additionally, the processing resources include applications that are used to translate, encrypt/decrypt, authenticate, forward and/or route any network packets received from the switching fabric.

In one embodiment of the present invention, a plurality of netmods, a switching fabric, and a plurality of processing resources are assembled as a network routing/switching device, such as a blade server. The blade server is configured and distributed by Cosine Communications, Inc. of Redwood City, Calif. The blade server can be assembled with a plurality of additional blade servers that interface with one another. Moreover, IPNOS product offerings, distributed by Cosine Communications, Inc. of Redwood City, Calif. can be modified to embody the teachings of the present disclosure. Of course as one of ordinary skill in the art readily appreciates, any hardware, firmware, and/or software configurations/products that are designed to achieve the tenets of the present disclosure can be used. Thus, all such configurations/products are intended to fall within the scope of the present invention.

Figure 1:
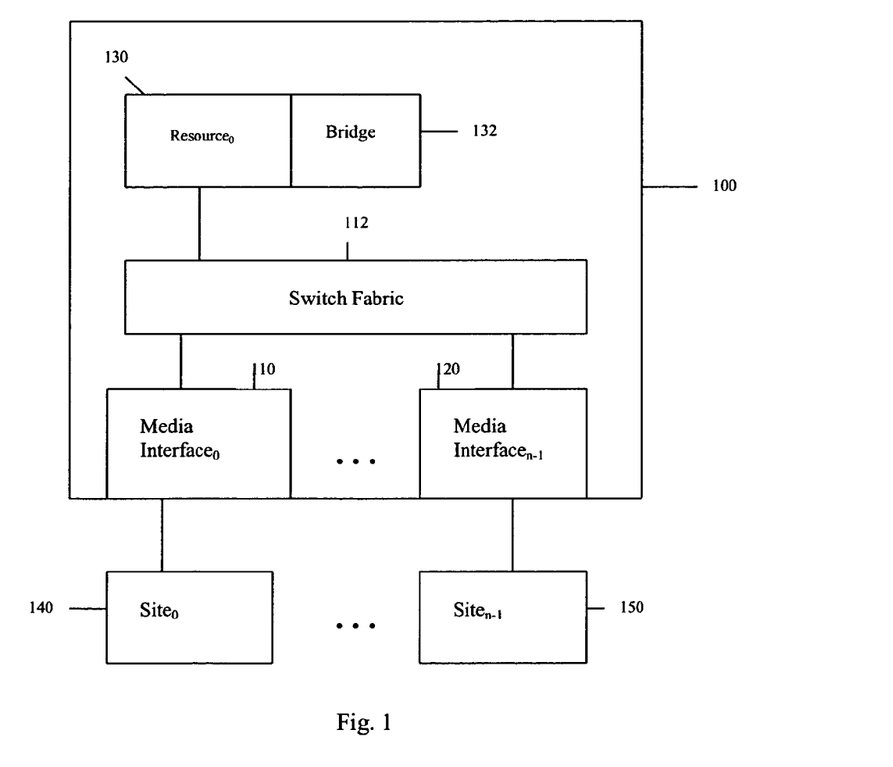
FIG. 1 shows a diagram of a network packet media bridging system, according to the present invention.

FIG. 1 illustrates a diagram of a network packet media bridging system 100, according to the present invention. The bridging system 100 includes a plurality of netmods (e.g., 110 and 120), a switching fabric 112, and a processing resource 130. The processing resource 130 includes a bridging application 132 executing on or accessible to the processing resource 130. The netmods (e.g., 110 and 120) are connected to telecommunication lines associated with other networks (e.g., 140 and 150). Connections to the telecommunications lines are made via line interface ports included within the netmods (e.g., 110 and 120).

The netmods (e.g., 110 and 120) include memory and processing elements for receiving network packets from the line interface ports or for sending network packets out over the line interface ports. In some cases, the memory included within the netmods (e.g., 110 and 120) is Static Random Access Memory (SRAM), which is volatile memory permitting fast access to data. Moreover, the netmods (e.g., 110 and 120) are associated with a specific type of media transmission channel (e.g., ATM, GigE, TDM, FR, and the like). Additionally, a netmod (e.g., 110 or 120) can be wireless. Thus, network netmods (e.g., 110 and 120) need not be physically connected to a telecommunications line, but, rather, can be a transceiver for transmitting and receiving wireless (e.g., Radio Frequency (RF), Infrared (IR), Satellite, and the like) network packets.

The switching fabric 112 is hardware, firmware, and, in some instances, software instructions that receive forwarded network data packets from the netmods (e.g., 110 and 120) and rapidly transfer the packet to the processing resource 130. Conventionally, switching fabric is hardwired from a specific netmod to a specific processing resource for each disparate media transmission (e.g., ATM, GigE, TDM, FR, wireless, and the like). The switching fabric 112 can also receive network packets from the processing resource 130 and forward the network packets along to the appropriate netmod (e.g., 110 and 120).

A number of applications executing on the processing resource 130 receives network packets and performs a variety of translations/operations on the network packets, such as forwarding, routing, encryption/decryption, authentication, and the like. Additional applications executing on the processing resource 130 can also be used to communicate with other processing resources (not shown in FIG. 1).

The processing resource 130 includes a bridging application 132. The bridging application 132 translates network packets from disparate media formats received from disparate netmods (e.g., 110 and/or 120). Each network packet received by the bridging application 132 includes metadata associated with the addressing particulars of each network packet. The metadata also includes Ethernet header data that is transmitted on top of the network data packets over the disparate media transmission channels.

The bridging application 132 inspects this metadata to strip the Ethernet header. The Ethernet header data allows the bridging application to associate the network packets with a standard intermediate media format. Moreover, once the network packets are associated with the intermediate format, and the next address locations for the network packets determined, then the bridging application 132 translates the network packets into a media format required of any destination (e.g., next address location) netmod (e.g., 110 and 120).

If the received network packet is in a first media format and is destined to be relayed to a netmod (e.g., 110 or 120) associated with a second media format, then the bridging application 132 uses the metadata information available for each media format and translates the received network packet to the second media format before relaying the network packet along to the appropriate netmod (e.g., 10 or 120) that is handling network traffic associated with the second media format. This is achieved by using the Ethernet header data to first translate the received network packet to Ethernet and then to the second media format.

In one embodiment, the bridging application 132 has access to a translation table that permits it to translate from an Ethernet media format to the desired media formats. The table includes row identifiers for metadata elements and column identifiers for the media formats. Each cell of the table includes the corresponding equivalent for a particular metadata element and a particular media format. For example, a metadata header element can be identified by indexing to a row in the table having an identifier associated with headers, such as "r-x," where r identifies a row entry and x identifies a specific metadata element. Moreover, the desired translation from Ethernet format to a desired second media format can be acquired by indexing the appropriate column "c-f" for the desired media format, where c represents a column entry and f is the desired media format.

For example if the originally received media format is FR and the desired media format is ATM, then the FR format is first translated to Ethernet using the Ethernet header transmitted on top of the packet in FR format. As one of ordinary skill in the art appreciates, a Frame Relay Access Device (FRAD) can be used to achieve the transmission of Ethernet on top of a FR transmission. Next, a single element of the Ethernet intermediate format is identified as a specific row entry "r-01" within the table, and by accessing the column identifier "c-ATM" associated the desired ATM format; a table cell is constructed by the tuple "r-01, c-ATM". The tuple provides the appropriate translation information to the bridging application 132 for translating the intermediate Ethernet format to ATM.

Thus, the bridging application 132 translates a network data packet from FR to ATM. Of course a variety of more complex translation can be required, such that the cells of the table process other applications in order to complete the translation from FR to ATM. All such translations are intended to fall within the scope of the present disclosure. Further, it is readily apparent that the bridging application 132 does not require a table for translations, since the logic to perform the translations can be embodied within the bridging application 132.

Thus, in some embodiments, the bridging application 132 can access a more complex table in order to perform the appropriate translations on the media formats, such as when metadata elements of one media format does not map directly (e.g., one to one relationship) to a like metadata element in another media format. In these cases, the cells of the table can include the appropriate translation instructions (e.g., pointers to other applications) or mappings, and the bridging application 132 is adapted to process or initiate these instructions or mappings.

Of course, the bridging application 132 need not include tables at all rather it can access software applications or software objects that assist in performing the appropriate media format translations. Moreover, in some cases, the bridging application 132 can access a plurality of translation tables each linked to one another for purposes of performing the appropriate translations between media formats. Thus, the bridging application need not, in all circumstances, first translate a received network packet to an intermediate Ethernet format. For example, parsing requirements for separating the different elements associated with the metadata of a particular media format can be initially acquired by indexing on the received media data format in order to acquire the appropriate parsing instructions for the received metadata. Furthermore, as one of ordinary skill in the art readily appreciates, the translation information included within any cell of a table can be a direct mapping or a pointer to another application that knows how to perform the appropriate translation to a desired format. In this way, the translation information can be more complex and used to execute additional applications. And, in some cases, the additional applications can reside on additional and separate processing resources from the one in which the bridging application 132 is executing.

Furthermore, in some embodiments, the bridging application 132 can be instantiated, designed, and/or configured from a Graphical User Interface (GUI) application interfaced to the processing resource 130. Thus, as more translations between disparate media formats are desired, the bridging application 132 can be configured to accommodate the translation. Moreover, the configuration can be dynamic, so that the bridging application 132 need not be recompiled and re-linked when modifications are made. This can be achieved by using dynamic objects that are dynamically bound to the bridging application 132, or in the cases where the bridging application 132 acquires translation information from a dynamically modifiable table.

Accordingly, network packets associated with disparate media formats are received from different netmods and relayed to a single processing resource 130 having access to a bridging application 132. The bridging application 132 provides a virtual bridge between the disparate media formats, by translating the media formats of the network packets, as needed, before relaying any translated network packet to an appropriate netmod (e.g., 110 or 120).

As is now apparent to one of ordinary skill in the art, the present embodiments of the bridging system 100 offers significant improvements over conventional techniques, since a single processing resource 130 can execute a bridging application 132, which acts as a single bridging domain for all network packets. The virtual bridging system 100 is, therefore, not hardwired (as what has been conventionally required), and the virtual bridging system 100 can be dynamically configured and modified to adjust to the changing network patterns and needs of a network.

Figure 2:
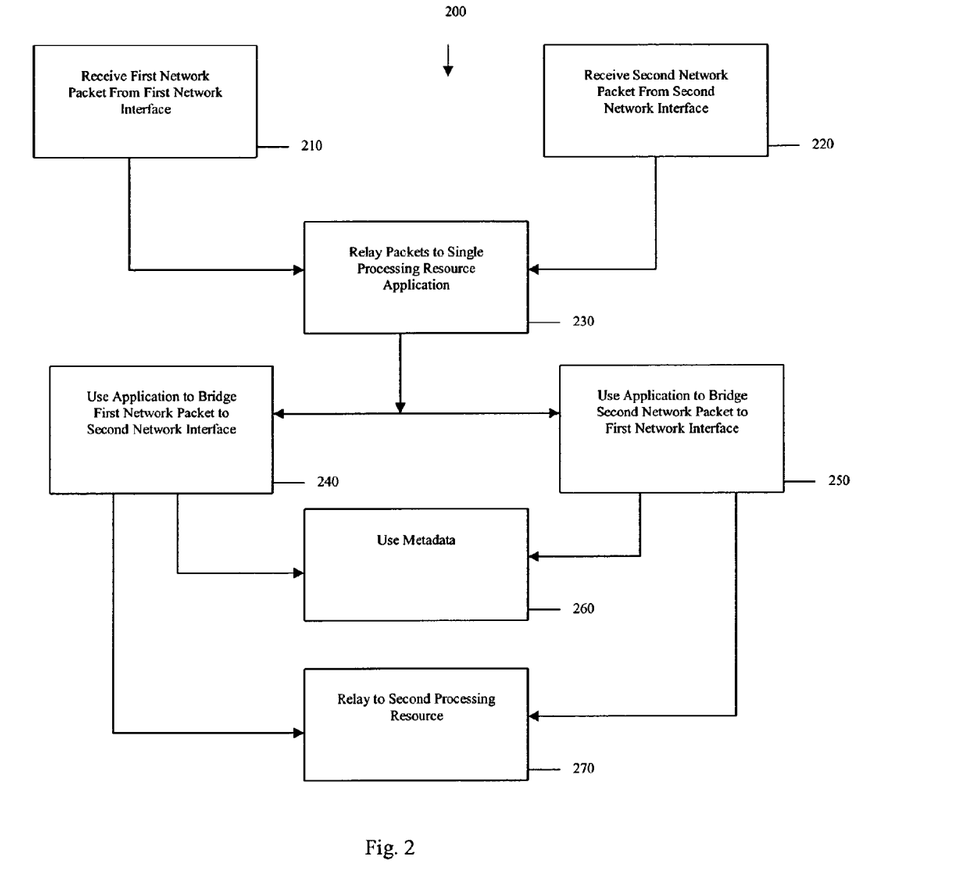
FIG. 2 shows a flow diagram of a method for bridging network packet media, according to the present invention.

FIG. 2 illustrates a flow diagram of a method 200 for bridging network packet media, according to the present invention. In one embodiment, of FIG. 2 the method 200 is implemented within a high-density server or blade server having a plurality of netmods, a switching fabric, and a plurality of processing resources. In other embodiments, the method 200 is implemented within any network router, network switch, or network-computing device. Each processing resource, can receive network packets from a number of the netmods, where each netmod is associated with a different media transmission channel and media format (e.g., ATM, GigE, TDM, FR, wireless, and the like). Of course, any configuration of computing devices implementing method 200 is intended to fall within the scope of the present disclosure.

In 210, a first netmod receives a first network packet from a first media channel, and, in 220, a second netmod receives a second network packet from a second media channel. Each network packet is in a data format associated with its respective media channel. The first and second netmods are designed to relay or steer the received network packets to a single processing resource, as depicted in 230. In some embodiments, the first and second packets also include Ethernet transmitted on top of its native media data format.

The processing resource includes a bridging application, which is processed when the packets are received by the processing resource. The bridging application can execute one or more instructions and/or access one or more tables (or any data structures) in order to bridge the first network packet to the second media channel, as depicted in 240. Additionally, the bridging application can execute one or more instructions and/or access one or more tables to bridge the second network packet to the first media transmission channel, as depicted in 250.

In some embodiments, and in 260, the bridging application inspects the network packets for addressing information or metadata information. The information associated with any received network packet is inspected to determine where the received network packet is to be relayed next. If the relay location is a netmod associated with a disparate media format and a disparate media channel from what the received network packet was originally received in, then the bridging application translates the received network packet to an intermediate Ethernet format by using the network packet's Ethernet header included with the network packet. The intermediate Ethernet format is then used to translate the network packet to a destination media format before relaying the network packet to the appropriate netmod. In some cases, this translation can entail converting only the metadata information associated with the network packet.

In some instances, the bridging application can determine, upon inspecting a received network packet, that to properly translate the received network packet, one or more transfers need to occur by relaying the network packet to a second application residing on a second processing resource, as depicted in 270. Alternatively, the bridging application can relay the received network packet to a second application executing on the same processing resource as the bridging application.

The bridging application is a virtual bridge between heterogeneous network packet media. In some embodiments, the bridging application can be dynamically instantiated, configured, and/or modified by using a GUI application interfaced to the processing resource. Thus, method 200 provides a virtual bridge from within a single processing resource to translate between disparate media formats and disparate media channels. This virtual bridge provides a single bridging domain for network packets of disparate media formats.

Figure 3:
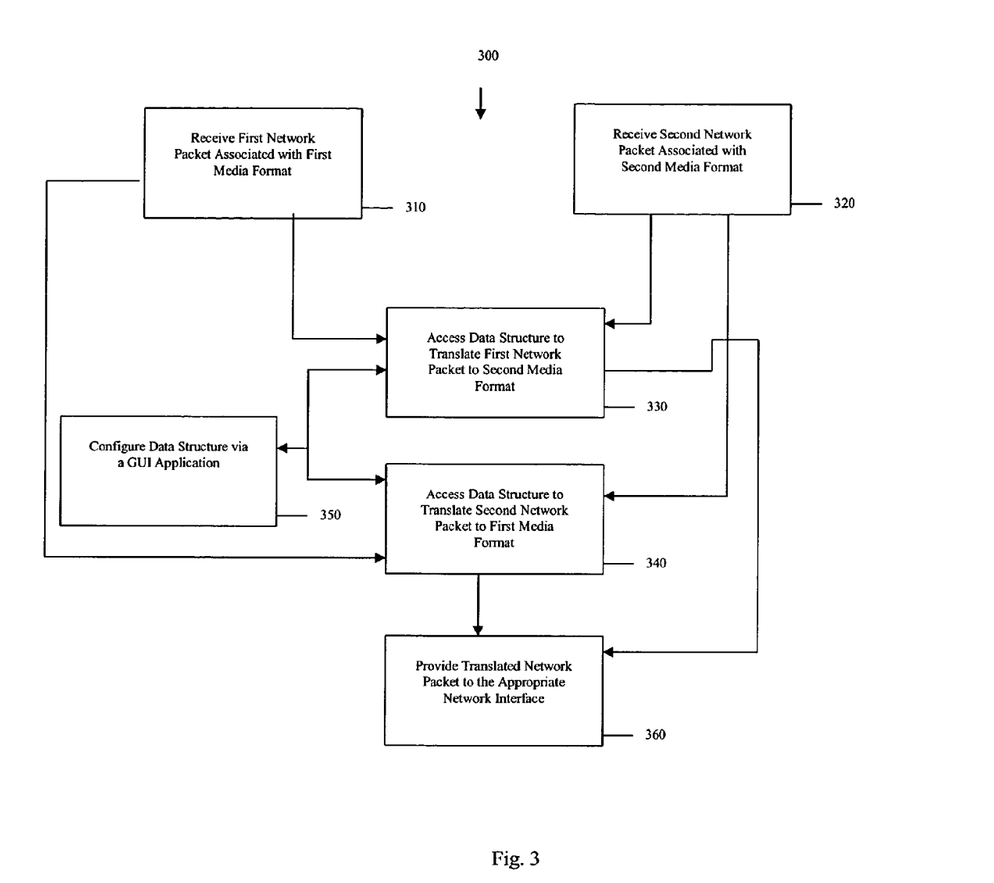
FIG. 3 shows a flow diagram of another method for bridging network packet media, according to the present invention.

FIG. 3 illustrates a flow diagram of another method 300 to bridge network packet media, according to the present invention. In some embodiments, the method 300 is implemented within a high-density or blade server. The blade server includes a plurality of network interfaces, a switching fabric, and a plurality of processing resources. Additionally, the method 300 can be implemented within any network router, network switch, or network-computing device. However, any configuration of computing devices implementing method 300 is intended to fall within the scope of the present disclosure.

In 310, a first network packet is received and is identified as being associated with a first media format (e.g., GigE, ATM, FR, TDM, wireless, or others). Additionally, in 320, a second network packet is received and is identified with a second media format. In some embodiments, the network packets are received from disparate netmods where each netmod is designed to relay and transmit network packets from and to a specific media transmission channel (e.g., GigE, ATM, FR, TDM, wireless, or others).

In 330, a translation data structure is accessed to translate the second network packet from the second media format to the first media format. Additionally, in some embodiments, and in 340, the translation data structure is accessed to translate the first network packet from the first media format to the second media format. In this way, the translation data structure acts as a virtual bridge between disparate media formats associated with the network packets. Further, in one embodiment, the first and second network packets are translated to Ethernet format before translation to a desired media format occurs. This can occur, when the network packets also include Ethernet transmitted on top of their native media formats.

In some embodiments, the translation data structure is configurable and instantiated within a single processing resource by using a GUI application interfaced to the processing resource and the translation data structure, as depicted in 350. The translation data structure can be one or more data structures (e.g., tables, lists, trees, and the like) logically linked together. Moreover, information within the translation data structure can permit the execution of instructions (e.g., pointers to other external applications) in order to assist with translation between heterogeneous media formats.

Moreover, in some cases, the translation data structure can be implemented within a bridging application that executes on a single processing resource, where the processing resource receives the network packets from a plurality of netmods associated with disparate or different media transmission channels and formats.

Once, the translation data structure is accessed to translate or bridge the disparate media formats, then, in 360, the translated network packet is provided to the appropriate netmod associated with the translated media format. Thus, the translation data structure is used as a virtual bridge between heterogeneous packet media. The translation data structure is dynamically configurable and modifiable to accommodate a plurality of media translations desired within a network.

Also, as one of ordinary skill in the art will readily appreciate, translation data structure is used on Layer 3 (e.g., network or IP layer), and is capable of linking the necessary metadata associated with addressing various media formats. Metadata includes header information and other information used in resolving network packet addresses. Disparate media formats can include disparate metadata. Conventional approaches resolve the disparate addressing between media formats by dedicating a single processing resource having applications that are used to translate the metadata for each media format. In the present invention, a single processing resource utilizes application(s) that accesses the translation data structure for received and translated network packets, in order to bridge heterogeneous packet media. Thus, in various embodiments of the present invention, a single bridging domain is provided for media bridging.

Figure 4:
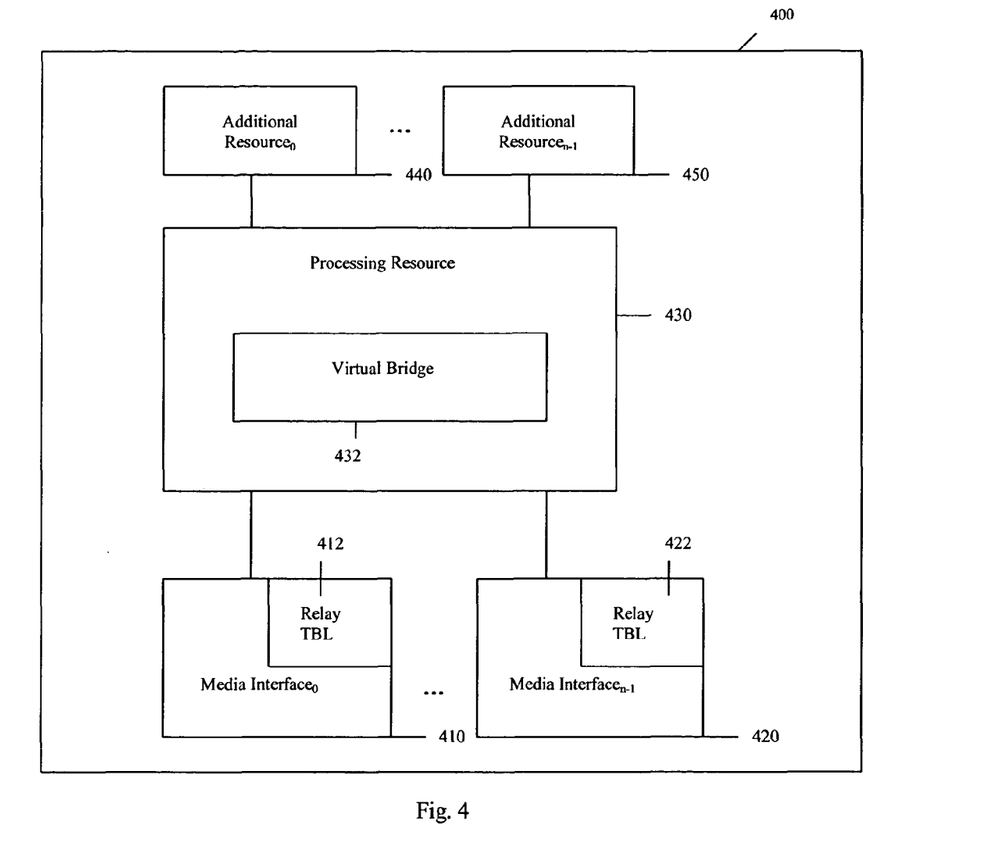
FIG. 4 shows a diagram of another network packet media bridging system, according to the present invention.

FIG. 4 illustrates a diagram of another network packet media bridging system 400, according to the present invention. The media bridging system 400 includes a plurality of netmods (e.g., 410 and 420), a relaying data structure (e.g., 412 and 422) for each netmod (e.g., 410 and 420), and a bridging application 432 that resides in a processing resource 430. The bridging system 400 can be implemented in a high-density or blade server. Alternatively, the bridging system 400 can be implemented in any network router, network switch, of network computing device. Of course, other configurations of computing devices that provide the media bridging of the present invention can also be implemented, without departing from the present invention.

Each netmod (e.g., 410 and 420) includes a plurality of line interface ports (not depicted in FIG. 4). The line interface ports accept network traffic from a telecommunications line (a transceiver when the network traffic is wireless). The netmods (e.g., 410 and 420) identify and select network packets from the network traffic occurring on the line interface ports. Each of the netmods (e.g., 410 and 420) is associated with different media channels (e.g., GigE, ATM, TDM, FR, wireless, and others).

The relaying data structures (e.g., 412 and 422) are accessed when network packets are identified by the netmods (e.g., 410 and 420). The relaying data structures (e.g., 412 and 422) permit the netmods (e.g., 410 and 420) to relay the network packets to the processing resource 430. The relaying data structures (e.g., 412 and 422) are dynamically configurable within the processing resource 430 and provided to the netmods (e.g., 410 and 420). In some embodiments, the relaying data structures (e.g., 412 and 422) are represented as SRAM tables within the netmods (e.g., 410 and 420). The SRAM tables (e.g., 412 and 422) can include identifiers for the processing resource 430, the netmods (e.g., 410 and 420), and identifiers for line interface ports (not depicted in FIG. 4).

When the network packets are relayed from the netmods (e.g., 410 and 420), they can include an Ethernet transmitted on top of the native media format. However, the metadata-addressing format of the network packets may still be in a format associated with the original media channel format.

The bridging application 432 receives the relayed network packets and detects the original media channel formats for the network packets based on metadata associated with the network packets. The bridging application 432 then translates a number of the network packets from a received media channel format to a requisite media channel format, based on where a particular network packet is to be relayed to next. Yet, as one of ordinary skill in the art readily recognizes, this translation can be done on an Ethernet format, when the network packets include Ethernet on top of their native media formats. Finally, the bridging application 432 translates any number of the network packets from the received media channel formats to requisite media channel formats. In this way, the bridging application 432 uses metadata associated with disparate media formats to bridge the network packets between heterogeneous media formats using traditional Ethernet, or any other intermediate media channel format transmitted on top of the network packets along with their native media formats.

In one embodiment, the bridging application 432 communicates with one or more additional processing resources (e.g., 440 and 450). The bridging application 432 can use these additional processing resources (e.g., 440 and 450) to assist in bridging between heterogeneous media formats. In this way, processing can be offloaded from the processing resource 430 to the additional processing resources (e.g., 440 and 450).

In some embodiments, the bridging application 432 is dynamically instantiated and configured through a GUI application communicating with the processing resource 430. The configurations can include parameters that identify the media formats that the bridging application 432 is capable and permissibly allowed to bridge. The bridging application 432 can be provided as an Application Programming Interface (API) library, or as an OO class object having public and private methods. The API can be provided as a Dynamic Linked Library (DLL) or a shared library. Of course, any implementation, including stand alone ad hoc implementations, of the bridging application 432 that is designed to bridge heterogeneous media formats from a single processing resource 430 is intended to fall within the scope of the present invention. Moreover, the bridging application 432 can use one or more tables or other data structures to bridge heterogeneous media formats.

CONCLUSION

Methods and systems detailed above packet media bridging in a network. These methods and systems create a single media bridge domain for use in network routing environments. In contrast, traditional approaches have relied on hard-wired and static implementations of switches and media bridges, thereby creating a plurality of media bridging domains. Accordingly, the present invention permits better utilization and load balancing of an enterprise's network routing resources.

Furthermore, the virtual media bridges of the present invention are dynamically configurable to meet the changing needs of an enterprise's network traffic. In some embodiments, the configuration of the virtual bridges can be altered using a GUI application in communication with a processing resource. Moreover, the processing and memory capabilities of the processing resource can be published and made available within the GUI application. In this way, an enterprise can monitor and alter network traffic as needed with the teachings of the present invention, without the need to acquire additional hardware and software resources.

Although specific embodiments have been illustrated and described herein, it will be appreciated by one of ordinary skill in the art that any arrangement that is calculated to achieve the same purpose may be substituted for the specific embodiments shown. This application is intended to cover any adaptations or variations of the present invention. Therefore, it is intended that this invention be limited only by the claims and the equivalents thereof.

What is claimed is:
1. A network-computing device comprising:
a plurality of network interfaces (netmods), including a first set of netmods operable to receive network packets encapsulated within a first plurality of media transmissions each having a first framing media format of a plurality of framing media formats and a second set of netmods operable to transmit network packets encapsulated within a second plurality of media transmissions each having a second framing media format of the plurality of framing media formats;
a plurality of processing resources coupled to the plurality of netmods and shared by the plurality of netmods, including a first processing resource upon which a virtual bridging application executes, the virtual bridging application representing a single bridging domain for all network packets received by the network-computing device;

a non-transitory memory, accessible to the first processing resource, having stored therein one or more translation data structures defining translations between the first framing media format and an intermediate format and between the intermediate format and the second framing media format;

wherein responsive to receiving a network packet, the first set of netmods pass the network packet to the virtual bridging application;

the virtual bridging application determines a relay location to which the network packet is to be relayed and whether the relay location is among the second set of netmods, which are associated with a disparate framing media format and a disparate media channel than that of the first set of netmods;

responsive to an affirmative determination that the relay location is among the second set of netmods, the virtual bridging application uses the one or more translation data structures to translate the network packet to the second framing media format before relaying the network packet to the relay location.

2. The network-computing device of claim 1, wherein an intersection of the first set of netmods and the second set of netmods results in a non-null set.

3. The network-computing device of claim 1, wherein an intersection of the first set of netmods and the second set of netmods results in a null set.

4. The network-computing device of claim 1, wherein the virtual bridging application is configurable to accommodate framing media translations desired to be performed by the network-computing device.

5. The network-computing device of claim 1, wherein the virtual bridging application relays at least the network packet to one or more other applications running on a second processing resource of the plurality of processing resources in order to assist in bridging between a first media channel associated with a first netmod of the first set of netmods and a second media channel associated with a second netmod in the second set of netmods.

6. The network-computing device of claim 1, wherein the plurality of framing media formats include one or more of a Gigabit Ethernet (GigE) format, a Frame Relay (FR) format, a Time-Division Multiplexing (TDM) format, an Asynchronous Transfer Mode (ATM) format and a wireless media format.

7. The network-computing device of claim 1, wherein the network-computing device comprises a network router.

8. The network-computing device of claim 1, wherein the network-computing device comprises a network switch.

9. The network-computing device of claim 1, wherein the network-computing device comprises a blade server.

10. The network-computing device of claim 1, wherein the virtual bridging application is dynamically instantiated, configured or modified using a graphical user interface application interfaced to the first processing resource.

11. The network-computing device of claim 1, wherein the virtual bridging application is provided as an Application Programming Interface (API) library.

12. The network-computing device of claim 11, wherein the API is provided as a Dynamic Linked Library (DLL).

13. The network-computing device of claim 11, wherein the API is provided as a shared library.

14. The network-computing device of claim 1, wherein the virtual bridging application is provided as an object oriented class object having public and private methods.

15. The network-computing device of claim 1, wherein the network packet comprises an Ethernet frame and the virtual bridging application permits media agnostic Ethernet bridging between the first set of netmods and the second set of netmods.

* * * * *